United States Patent
Tosswill

[11] 4,099,833
[45] Jul. 11, 1978

[54] NON-UNIFORM FIBER OPTIC IMAGING SYSTEM

[75] Inventor: Christopher H. Tosswill, Sturbridge, Mass.

[73] Assignee: Galileo Electro-Optics Corp., Sturbridge, Mass.

[21] Appl. No.: 706,457

[22] Filed: Jul. 19, 1976

Related U.S. Application Data

[63] Continuation of Ser. No. 449,520, Mar. 8, 1974, abandoned.

[51] Int. Cl.² .................................. G02B 5/14
[52] U.S. Cl. .......................... 350/96.25; 350/96.15
[58] Field of Search .................... 350/96 BC, 96 B

[56] References Cited

U.S. PATENT DOCUMENTS

| 3,142,235 | 7/1964 | Siegmund | 350/96 B X |
| 3,187,627 | 6/1965 | Kapany | 350/96 B X |
| 3,212,397 | 10/1965 | Miller | 350/96 B X |
| 3,436,142 | 4/1969 | Siegmund et al. | 350/96 B |
| 3,566,602 | 3/1971 | Bergey et al. | 350/96 B X |
| 3,779,729 | 12/1973 | Hicks | 350/96 BC X |
| 3,874,783 | 4/1975 | Cole | 350/96 B |
| 3,936,841 | 2/1976 | Tiefenthal | 350/96 BC X |

FOREIGN PATENT DOCUMENTS

| 1,456,553 | 9/1966 | France | 350/96 BC |
| 2,235,821 | 3/1973 | Fed. Rep. of Germany | 350/96 BC |

Primary Examiner—John K. Corbin
Assistant Examiner—Rolf Hille

[57] ABSTRACT

An optical imaging system for achieving a non-uniform magnification of an input image utilizing a fiber optic taper having a planar input end surface and a curved output end surface, and a fiber optic cylinder having one curved end surface coupling to the curved taper end surface. This curved interface intersects the component fibers of the taper so that the effective diameter of each fiber end lying in the curved surface is dependent on its radial position in the surface. This variation in the effective fiber diameters results in an output image having a pattern of size amplification or reduction that is non-uniform. The form of the pattern and the degree of non-uniformity can be selected through a proper choice of the taper configuration. Further increases in the degree of non-uniformity of the output image are achieved by substituting a second taper for the fiber optic cylinder, or by coupling one or more additional tapers between the curved interface and the cylinder. In one form diverging and converging tapers are alternated and the coupling interfaces between fiber optic elements are also alternated between concave and convex shapes.

6 Claims, 6 Drawing Figures

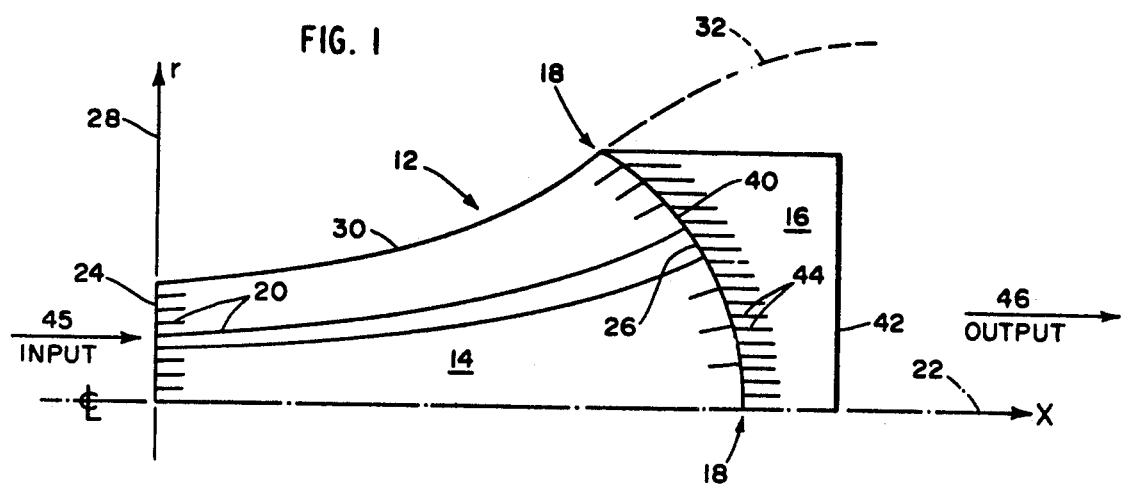
FIG. 1
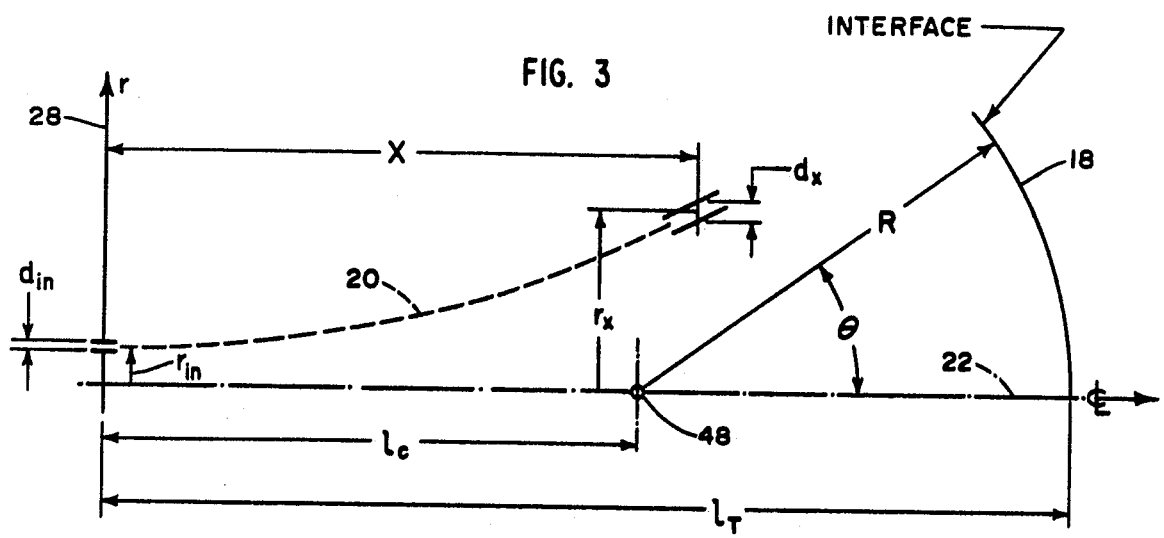
FIG. 3
FIG. 2
FIG. 4

NON-UNIFORM FIBER OPTIC IMAGING SYSTEM

This is a continuation of application Ser. No. 449,520, filed Mar. 8, 1974 now abandoned.

BACKGROUND OF THE INVENTION

This invention relates in general to optical systems and more specifically to a fiber optic imaging system that produces a planar image field that is a non-uniform magnification or minification of a planar object field. Systems having this capability are useful in such fields as photography, astronomy, surveillance, and weapons control.

In conventional optical systems, converging and diverging lenses are, respectively, the basic devices for magnifying and minifying an object image. These lenses produce either a real or a virtual image that is generally a uniform, or linear, magnification or minification of the object. Any non-uniformity in such a system is usually of a minor order and therefore treated as a lens aberration.

It is well known in the fiber optics to achieve magnification and minification effects comparable to those achieved with lenses by means of a taper. The taper, however, differs from conventional optics in that it produces a real and visible image in the same plane, transmits light more efficiently, and generally is satisfied with a shorter optical path.

The taper is essentially an aligned bundle of optically transmissive fibers that generally has the shape of a truncated cone. Each of the component fibers of the taper is a filament of a material such as glass or quartz that has a high index of refraction. The diameter of each filament increases uniformly from the minor diameter end of the taper to the major diameter end. Magnification occurs because light from an element of the object field that enters the small end of a given fiber is trapped in the fiber by total internal reflection until it emerges from the large diameter entrance. In minification, light from an element of an object field enters the large diameter end of a fiber and is "funneled" down to the small diameter end. In either case, the light exiting from the fibers forms a planar image field corresponding to the planar geometry of the exit surface. Magnification over the image field is uniform since the diameters of each fiber end lying in each end surface are identical.

SUMMARY OF THE INVENTION

The fiber optic imaging system of this invention transforms a planar image field into a non-uniformly magnified or minified planar object field by curving an end surface of a fiber optic taper and optically coupling it to a mating curved surface of a fiber optic cylinder containing fibers of constant diameter. The curved coupling interface of this optical system intercepts the fibers of the taper at different distances along the longitudinal axis of the taper. The image magnification over this surface therefore varies since the effective diameter of the fibers is a function of their projected length along the longitudinal axis. This relationship between the fibers diameter and their longitudinal projection is the magnification function of the taper. Through a proper selection of the magnification function and the curvature of the interface it is possible to design a fiber optic imaging system that has a selected pattern of magnification or minification.

In another embodiment of this invention, a higher order of departure from uniformity is achieved by interposing one or more additional taper stages between the curved output surface of the initial taper and the cylindrical element. By alternating diverging and converging tapers, as well as the direction of curvature of the coupling interfaces, it is possible to achieve an output image having the same overall area as the input image, but with a high degree on non-uniform magnification or minification within that area.

It is therefore an object of this invention to provide a fiber optic imaging system that produces a planar output image field that is a non-uniform magnification or minification of an object field.

Another object is to provide a fiber optic imaging system that may be designed with precision to yield a selected pattern of magnification or minification.

A further object of this invention is to provide a non-uniform fiber optic imaging system that is rugged, compact and does not require adjustment.

Still another object is to provide a non-uniform fiber optic imaging system that has good light transmission efficiency and produces a real and visible image.

Yet another object of this invention is to provide a non-uniform fiber optic imaging system that achieves a high degree of departure from uniformity in an output image that has approximately the same overall area as the input image.

These and other objects and features of the invention will be more fully understood from the following detailed description of the preferred embodiments of the invention which should be read in conjunction with the accompanying drawings.

BRIEF DESCRIPTION OF THE DRAWINGS

FIG. 1 is a cross-sectional side elevation of the top half of a fiber optic imaging system constructed in accordance with this invention.

FIG. 2 is an enlarged fragmentary view of a single fiber from the taper of the embodiment shown in FIG. 1, showing projections of cross-sections of the fiber along the axis of the fiber and a plane normal to the longitudinal axis of the system.

FIG. 3 is a view similar to FIG. 1 showing the geometry of the taper.

FIGS. 4-6 are cross-sectional side elevations of alternative embodiments of a fiber optic imaging system constructed according to this invention which employs one or more amplifier stages.

DETAILED DESCRIPTION OF THE PREFERRED EMBODIMENTS

Figure 5:
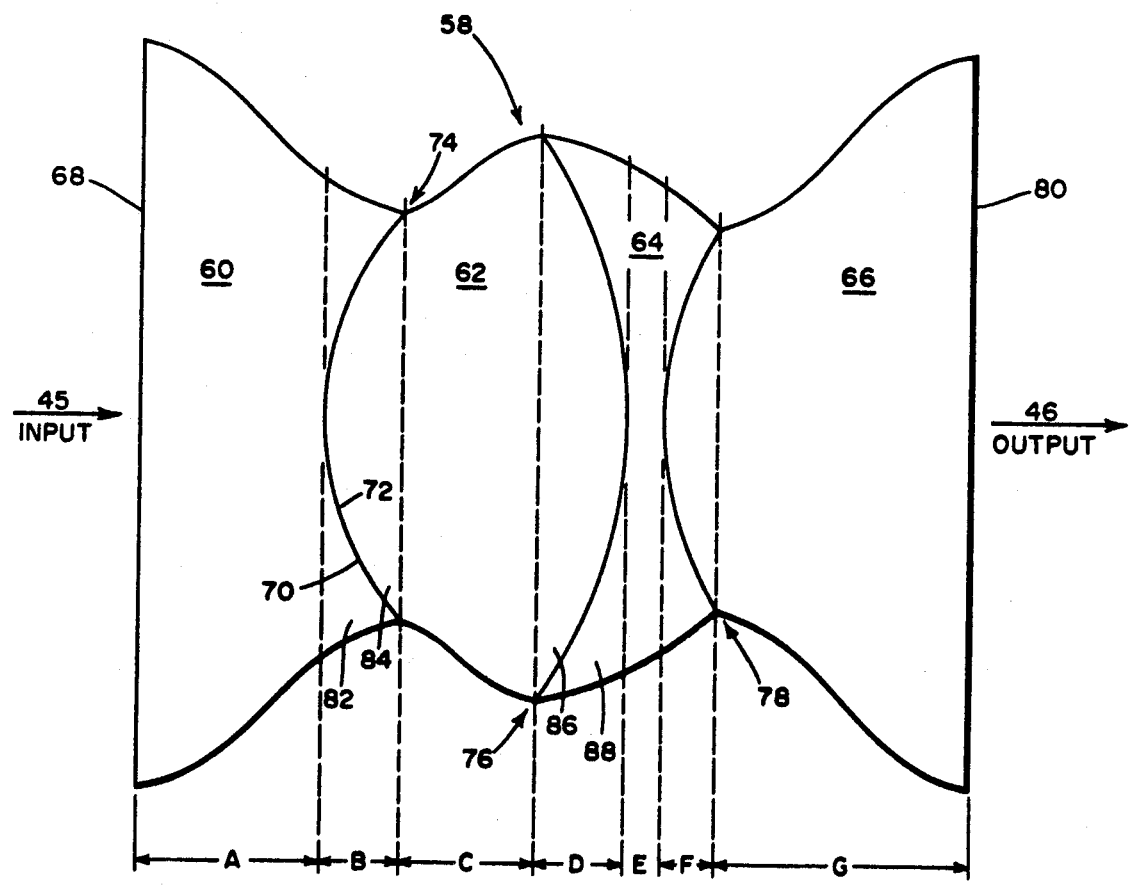

FIG. 1 illustrates in cross-section the top half of a non-uniform fiber optic imaging system 12 that has a taper 14 and a fiber optic plate or cylinder 16 joined at a curved interface 18. The taper 14 is composed of a large number of aligned fibers 20 each of which is coplanar with the longitudinal X-axis 22 of the system. The fibers 20 extend from a planar surface 24 at the minor diameter end of the taper to a curved surface 26 at the major diameter end of the taper.

The fibers 20 are fine filaments of a material such as glass or plastic that transmits light in the visible and infra-red frequencies and has a high index of refraction. The central core of each fiber is coated with a material such as glass or plastic having a lower index of refraction. The coating materials should also have a melting point and coefficient of thermal expansion compatible with that of the core material. Light impinging upon one end of these fibers within a certain range of incident angles will be trapped within the fiber by multiple total internal reflections and emerge from the other end of the fiber. In effect, the fibers act as a light guide, in a manner analagous to a pipe carrying water.

Aligned bundles of fiber are typically formed by packing the fibers in parallel alignment and heating the assembly until a bonding material, or the coating material, fuses and forms the fibers into a solid matrix. In such a bundle, the coating acts as optical insulation to almost entirely eliminate the coupling of light between adjacent fibers.

The taper 14 is produced from a cylindrical fused bundle of generally circular fibers 20. The bundle is heated symmetrically to a point where an axial pulling force draws the mass to a reduced diameter. After annealing, the minor diameter is cut with a diamond saw to form the end surface 24. Conventional grinding and polishing operations produce the curved surface 26. The drawing process, however, causes variations along the length of the fibers 20 in their direction, cross-sectional shape, and effective diameter.

As shown in FIG. 1, during the drawing process the fibers 20 that lie off the central axis 22 assume directional component along a radial axis 28. The direction of these fibers over their entire length is reflected in the shape of the taper side 30 defined by one of the peripheral fibers 20. In the illustrated embodiment the side 30 is an upward-facing concave curve. However, it is possible to produce tapers having sides that are linear, convex, or compound curves. For example, the dotted line 32 suggests a possible shape of the taper 14 before the surface 26 is formed.

The drawing process also alters the cross-sectional shape of the fibers. FIG. 2 illustrates a typical off-axis fiber 20 in the taper 14. The cross-sectional shape of the fiber, when viewed on end, changes from a circle to an ellipse 34. However, after drawing the cross section defined in a plane normal to the X-axis 22 is circular. Thus, if the taper is cut in any plane defined by a constant value of X, all of the exposed fiber ends in that plane will be circular in shape. Moreover, it has been empirically determined that each of these co-planar circles has the same diameter. This characteristic is the basis of the uniform magnification properties of conventional tapers.

Another significant effect of drawing a fiber bundle into a taper is that the size of the fibers, or more specifically, their effective light transmission diameter as projected on a plane normal to the X-axis, varies along their length. Before drawing, the fibers have a constant diameter, typically in the range of 5 to 50 microns. After drawing, the fiber diameters decrease uniformly from a maximum value at the major diameter end to a minimum value at the minor diameter end. As mentioned above, this variation is such that the fiber diameters lying in a common transverse plane are the same. Therefore, the diameter of any fiber is independent of the variable $r$ representing the radial position of the fiber in the taper, and is a function solely of its longitudinal position measured along the X-axis 22 from the end surface 24. This functional relationship is termed the magnification function $f(x)$ of the taper and is represented graphically by line 30 that defines the shape of the taper side.

A principal feature of this invention is the curved major diameter end 26 of the taper. This curved configuration causes the image magnification (or minification) to be a function of $r$, the radial position of the image as well as the longitudinal coordinate, X. This occurs because the curved surface intercepts the fibers in different transverse planes, and therefore at different effective diameters. The result is a non-uniform pattern of image amplification or reduction over the surface 26. The form of the pattern depends on the shape of the curved surface 26 and the magnification function $f(x)$. In the illustrated embodiment, the surface 20 is spherical and yields a pattern of high magnification at the central portion of the image field and reduced magnification at the periphery.

Coupled to the surface 26 is a matching, curved surface 40 of the fiber optic plate or cylinder 16. The plate 16 consists of a large number of parallel optical fibers 42 that extend from the curved surface 40 to a planar surface 44. The number of fibers in the plate 16 is not necessarily the same as those in the taper 14, and the fibers do not necessarily align with those of the taper. But they are located in sufficient proximity to receive the image transmitted by the fibers 20 across the interface 18 or to transmit light to the fibers 20. The effect of the plate 16 is to convert or "flatten" the curved image field at the interface 18 into a flat field at the surface 42. The plate 16 can be coupled to the taper 14 by any suitable means such as a thin layer of a translucent adhesive.

To operate the system 12 as a magnifier of the central region of an image relative to its periphery, the input or object image indicated by the arrow 45 (FIG. 1) is introduced to the taper surface 24. Each fiber end in the surface 24 accepts and transmits light whose angle of incidence lies within a small solid angle. This angle defines an image element that is transmitted the length of the fiber 20. The attenuation of the beam during transmission usually is of the order of 10 percent. As the light rays are internally reflected by the walls of the fiber, which are uniformly widening, the image element carried in the tube expands correspondingly. This effect generates a magnification of the output image indicated in FIG. 1 by the arrow 46.

The magnification at any point in the fiber is a function of the fiber diameter at that point. In general, the magnification function $f$ at point $x$ can be defined as follows:

$$f(x) = d_x/d_{in} \tag{1}$$

where $d_x$ is the diameter of a fiber cross section lying in a plane normal to the x-axis and $d_{in}$ is the diameter of the fiber at the surface 24 (FIGS. 2 and 3). At the output end of the fiber, the overall magnification of the fiber is given by the ratio $d_{out}/d_{in}$ where $d_{out}$ is the diameter of the output end of the fiber projected on a plane normal to the x-axis 22 (FIG. 3). Further, it can be readily seen that:

$$f(x) = r_x/r_{in} \tag{2}$$

where $r_x$ is the radial position of a given fiber at a longitudinal position $x$, $r_{in}$ is the initial position of the fiber at the surface 24.

At the interface 18, the light transfers from the fibers 20 of the taper to the fibers 44 of the plate. During the transfer the entry angle of some of the light may be too severe for it to be conducted within the fibers 44. Some light loss is also attributable to the inter-fiber matrix of the plate 16. Resolution is also adversely affected by the interface since light from a single fiber 20 may be received by more than one fiber 44. The magnified output image 46 emerges at the planar surface 42. The image is a non-uniform magnification of the input image 45. Because the output image is real, it can be used to expose a photographic plate. The output is suitable for direct vision, photography, application to a photoelectronic component such as a television camera, or further processing by other optical elements.

To use the optical system 12 for the relative minification of the central portion of an image, the input is applied to the flat plate surface 42. The fibers 44 transmit the image elements across the interface 18 to the surface 26. The taper fibers 20 then transmit and "funnel" the light to the flat taper end 24 where the non-uniformly reduced output image is formed. The process is the reverse of magnification, except that the light transmission efficiency is less for minification than magnification because in a fiber of diminishing diameter the angles between the light paths and the fiber axis increase, and some light is able to escape from the fiber. It should be noted that if the direction of curvature of the spherical interface 18 is reversed (the type 14 having a concave rather than a convex end surface 26) than the system 12 will operate in a new mode. The output image will then have an overall magnification, but the central portion will be magnified to a lesser degree than the peripheral portions of the output image.

With reference to FIG. 3, it is possible to utilize the symmetry of the taper 14, the surface 26, and the empirically observed characteristics of the individual fibers in a taper to derive a mathematical description of the taper. First, the taper shape 30, which is a graphical expression of the magnification function $f(x)$, can be approximated by a Fourier series. As a first approximation, $f(x)$ can be expressed as a single term half sine-wave expansion as follows:

$$f(x) = 1 + [\frac{n-1}{2}][1 + \sin \frac{\pi}{2}(\frac{2x}{L_t} - 1)] \quad (3)$$

where $L_t$ is the total length of the taper (FIG. 3) and $n$ is the overall magnification achieved by a conventional flat ended taper having a length $L_t$.

The spherical geometry of the surface 26 yields the following two equations:

$$x = L_c + R \cos \theta \quad (4)$$

$$r_x = R \sin \theta \quad (5)$$

where $R$ is the radius of curvature of the surface 26, $L_c$ is the distance along the X-axis 22 to the center of curvature 48, and $\theta$ is the angle between the X-axis and the radius R. Using the equations (1) – (5), the variables $x$, $r_x$ and $\theta$ can be eliminated to yield an expression for $f(x)$ dependent solely on the variable $r_{in}$. In other words, for a given optical system 12, the magnification of any portion of the input image depends solely on its radial position. Thus a preselected pattern and degree of non-uniformity in the output image can be designed through a proper selection of the magnification function $f(x)$ and the shape of the end surface 26. The design accuracy can be increased to whatever degree is required by the use of additional terms in the Fourier series expansion.

In an alternative embodiment illustrated in FIG. 4, a fiber optical imaging system 50 according to this invention has an amplifying stage 52 disposed between the taper 14 and the plate 16. The stage 52 is a fiber optic taper similar to the taper 14, except its minor diameter end terminates in a curved surface 54 that mates with surface 26 of the taper 14. The major diameter end of the taper 52 is also curved to form a surface 56 that mates with the complementary face 40 of the plate 16. The overall magnification of the system 50 is the sum of the magnification ratio $n$ of the taper 14 and the magnification ration $n'$ of the taper 52. Further, the stage 52 increases the departure from uniformity in the output image. It is also within the scope of this invention to utilize two or more taper stages in the manner of the stage 52 to achieve a high degree of non-uniformity in image amplification or reduction. These increases, however, are balanced against concurrent losses in light transmission and resolution.

FIG. 5 illustrates a fiber optic imaging system 58 according to this invention which employs a first taper 60, intermediate amplifying taper stages 62 and 64, and a final taper stage 66. The input image 45 is applied to the flat, major diameter end surface 68 of the taper 60. The minor diameter output end of the taper 60 has a concave, spherical surface 70 that mates with a similarly curved convex, minor diameter end surface 72 of the taper 62 to form the interface 74. Similar interfaces 76 and 78 couple tapers 62 and 64 and tapers 64 and 66, respectively. A significant feature of this system is that the direction of curvature of these interfaces alternate, interfaces 72 and 78 having a radius of curvature to the right (facing the taper 66) and interface 76 having a radius of curvature to the left (facing taper 60). Further, the tapers themselves alternate between converging tapers (60 and 64) and diverging tapers (62 and 66). The terms converging and diverging means that the diameters of the fibers decrease and increase, respectively, in the direction of the light transmission. In this embodiment, the final taper stage 66 has a flat output surface and serves as a field flattening element to provide a planar output image 46. It should be noted that the overall surface area of the input surface 68 and the output surface 80 are approximately the same.

In operation, the system 58 produces an output image 46 which is a highly non-uniform transmission of the input image 45. Since the interfaces are spherical, the central portion of the image 46 is magnified and the peripheral portions are minified. The effect of the system 58 on the transmitted image can be analyzed by considering the system as divided into successive regions A–F as shown in FIG. 5. Regions A, C, E and G, in effect, act as conventional tapers in that the magnification or reduction of the input image is uniform. Non-uniformity is introduced in the regions B, D and F by the curved interfaces 72, 76 and 78, respectively, in a manner similar to that described hereinabove with reference to the system 12. The curved taper surfaces defining these interfaces intersect the component fibers of the tapers at varying positions with respect to the longitudinal axis of the tapers and the system 58. This causes the image at the curved end surfaces to have a radially varying non-uniform size alteration. In the present case, however, the analysis is further complicated by the fact that the component fibers on both sides of the interface have a radial variation in their effective diameters. In contrast, in the system 12 shown in FIGS. 1 and 3, the effective fiber diameters vary on only one side of the curved interface 18, that is, in the end surface 26 of the taper 14.

Turning to the effect of interface 72 in region B on the transmitted image, the peripheral portion 84 of the taper 60 lying in the region B to the left of the interface 72 non-uniformly reduces the peripheral portion of the transmitted image through the combined action of the converging fiber diameters and the concavity of the surface 70. The portion 84 of taper 62 lying in region B, due to the diverging nature of the taper 62 and the convexity of the surface 72, has the effect of non-uniformity magnifying the central portion of the transmitted image to a greater degree than the peripheral portions. The net result of the image transmission through region B is therefore to introduce a pattern of non-uniformity in the image characterized by a central image portion of increased magnification relative to a peripheral region.

In region D, the concave portion 86 of the diverging taper 62 differentially magnifies the central portion of the transmitted image in the manner of the taper 14 in the system 12. The portion 88 of converging taper 64 lying in region D acts similarly to taper portion 82 of taper 60 to differentially and hence non-uniformly reduce the peripheral portion to the image received across the interface 76. The net result of the image transmission through region D is therefore to further increase the degree of non-uniformity first established in the region B. Finally, the region F acts in a fashion similar to the region B, both regions having similar elements and configurations, to still further increase the degree of non-uniformity in the pattern of magnification. The net effect of the system 58 is to achieve a very high degree of non-uniformity in the image amplification while having the overall area of the output image remain the same as that of the input image. It should be noted that the system 58 operates with reverse effects when the input image is applied to the surface 80 and the output image exits from the surface 68. In this case, the system 58 minifies or reduces the central portion of the output image non-uniformly with respect to the peripheral portions.

Figure 6:
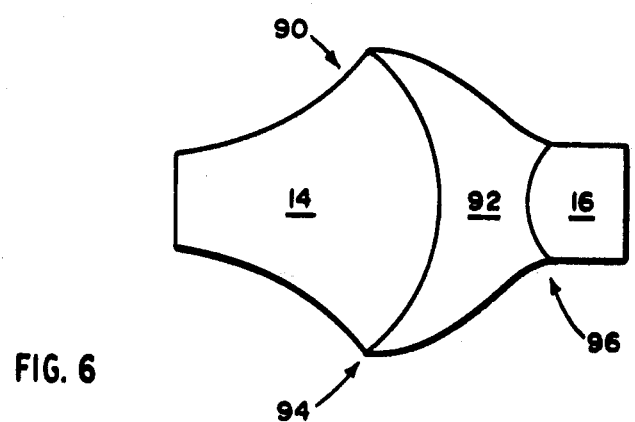

FIG. 6 illustrates a three stage optical system 90 according to this invention which has the diverging taper 14, a converging taper 92, and the cylindrical plate 16. The tapers are coupled at their major diameter ends in a curved interface 94 having a radius of curvature to the left (as illustrated). The minor diameter end of the taper 92 couples with the plate 16 in another curved interface 96 having a radius of curvature directed oppositely from that of the interface 94. Thus the system 90 is a hybrid of the alternating taper and alternating direction of curvature features of the system 58 and the initial diverging taper and cylindrical plate features of the system 12. With an input image applied to the planar end surface of the taper 14, the system 90 introduces a non-uniform magnification of the central image portion. The degree of departure from uniformity, however, is greater than that of the system 12 having an equivalent taper 14. Also, the system 90, like the system 58, produces an output image whose overall dimensions are the same as those of the input image.

By way of illustration only, a typical taper 14 has length of 5cm, a major diameter of 5cm, and a spherical surface 26 defined by a maximum value for $\theta$ of 45°. A single taper of this design can achieve variations in magnification from the center to the periphery of the output image of approximately 40 percent.

Although the optical systems have been described above as having spherical interfaces, it should be understood that a wide variety of alternative surfaces can be used to achieve a wide variety of patterns of non-uniform image size transformation. For example, it is possible to achieve magnification (or minification) along only one axis of the output surface by employing a cylindrical interface. Other possible forms include, but are not limited to, ellipsoids, truncated surfaces and planar surfaces forming an acute angle with the longitudinal axis of the taper.

Also, while this invention has been described in terms of a taper having a circular symmetry and circular fibers, other configurations can be employed. For example, the taper can have an octagonal or other polygonal cross section, and the fibers can have a hexagonal cross section to facilitate a closer packing of the fibers in the bundle and thereby achieve a higher degree of resolution. Still further, although the invention has been described with reference to planar image input and output surfaces, one or both of these surfaces may have any suitable alternative shape. For example, these surfaces may have a spherical curvature in order to facilitate the coupling of the invention with other optical systems. These and various other modifications will become apparent to those skilled in the art from the foregoing description and accompanying drawings. Such modifications are intended to fall within the scope of the appended claims.

What is claimed is:

1. A non-uniformly image-modifying optical device comprising
   a first bundle of optical fibers of varying length,
   a second bundle of optical fibers of varying length,
   a first imaging surface on said first bundle,
   a second imaging surface on said second bundle,
   each said imaging surface being in fiber-optically transmissive relation with each said bundle and spaced by at least one bundle from an interface between bundles, and
   said first bundle being joined with said second bundle at a curved interface therebetween,
   each said bundle having a tapering portion made up of optical fibers of diameter increasing with increase in bundle diameter in said tapering portion,
   said interface intercepting said tapering portion at varying distances along the length of said tapering portion, said distances being chosen so that said interface intercepts optical fibers of said tapering portion at varying cross-sectional areas thereof,
   whereby an image introduced onto one said imaging surface is made to appear, non-uniformly modified, on the other said imaging surface.

2. The optical device of claim 1 in which said imaging surfaces are planar, parallel, and perpendicular to the axes of bundles of optical fibers of which they are part.

3. The optical device of claim 1 in which said interface is spherical.

4. The optical device of claim 1 which comprises also a third bundle of optical fibers, said first and second bundles being tapered with diameters increasing toward said third bundle and said third bundle being cylindrical, said bundles being coaxial, said first and second bundles being optically coupled at said interface, and said second and third bundles being optically coupled at a second interface, said second interface intercepting said second bundle at varying distances along the length thereof and thus optical fibers of said second bundle at varying cross-sectional areas thereof, said interfaces being spherical about centers toward said first bundle therefrom, and said imaging surfaces being parallel, planar, portions of said first and third bundles, and perpendicular to said axis.

5. The optical device of claim 1 which comprises also a third and a fourth bundle of optical fibers, said first and fourth bundle carrying said imaging surfaces, said bundles being coaxial and said imaging surfaces being parallel, planar, and perpendicuar to the axis of said bundles, said first and third bundles tapering to decreased diameters in a direction away from said imaging surface of said first bundle, said second and fourth bundles tapering in the opposite direction, and spherical interfaces between said first and second, second and third, and third and fourth bundles, centers of said spherical interfaces being respectively away from, toward, and away from said imaging surface of said first bundle.

6. The optical device of claim 1 which includes a third fiber optic bundle, said first bundle and second bundle being tapered, said first bundle with diameter increasing toward said second bundle and said second bundle with diameter decreasing toward said third bundle, said third bundle being cylindrical, said bundles being coaxial, said imaging surfaces being carried by said first and third bundles and being parallel and planar and perpendicular to the axis of said bundles, said second bundle being optically coupled to said first and third bundles at spherical interfaces, the spherical interface between said first and second bundles being about a center away from said third bundle and the spherical interface between said second and third bundles being about a center away from said first bundle.

* * * * *